Feb. 19, 1963  W. G. CHALMERS  3,078,104
INDEPENDENT REAR SUSPENSION FOR SEMI-TRAILERS
Filed Aug. 2, 1961  2 Sheets-Sheet 1

Inventor
Wallace G. Chalmers
By Cushman, Darby & Cushman
Attorneys

Feb. 19, 1963 W. G. CHALMERS 3,078,104
INDEPENDENT REAR SUSPENSION FOR SEMI-TRAILERS
Filed Aug. 2, 1961 2 Sheets-Sheet 2

Inventor
Wallace G. Chalmers
By Cushman, Darby & Cushman
Attorneys a load-carrying frame... [skipping]

United States Patent Office 3,078,104
Patented Feb. 19, 1963

3,078,104
INDEPENDENT REAR SUSPENSION FOR SEMI-TRAILERS
Wallace G. Chalmers, Beaconsfield, Quebec, Canada, assignor, by mesne assignments, to Hawker Siddeley Canada Ltd., Montreal, Quebec, Canada
Filed Aug. 2, 1961, Ser. No. 141,229
Claims priority, application Canada June 7, 1961
3 Claims. (Cl. 280—124)

This invention relates to independent suspension for axles, particularly rear axles, for trucks or trailers.

The advantages of independent air suspension systems and independent wheel suspensions are well known. However, although attempts have been made to develop suspension systems which combine both these features, such systems have not met with great commercial success because the resultant combination has not provided the combined advantages of the individual systems.

To improve the ride characteristics of any suspension system, it is desirable to keep the unsprung mass such as axles, springs, torsion bars, or other heavy masses to a minimum. The presence of a high unsprung mass leads to a great deal of tire wear since the tires have to bear the additional forces caused by the greater inertia of such a mass. Stabilizing rods and through axles have been a very common feature of the prior art but the use of both such components have increased the unsprung mass and reduced both the riding qualities and tire life of the suspension. With axles, when a wheel strikes a bump the unsprung mass will tend to rotate about a roll centre above the axle and the tires will be scuffed or flexed sideways.

With suspension systems of the present invention, when longitudinal shocks are applied, the vertical and horizontal components of such a shock will be absorbed by a recession of the wheel.

It can be shown that in independent suspension systems, the resistance to side-sway varies directly with the square of the distance between the wheel track centrelines.

In systems employing through axles the resistance to side-sway varies directly with the square of the distance between the springs. Therefore, for any given vehicle an independent suspension system should have approximately four times the resistance to side-sway of a system employing a through axle. The roll centre, an imaginary point about which the sprung mass oscillates, varies from independent to through axle suspension. In the independent suspension system it is at ground level, whereas in the through axle system it is disposed above the axle.

Since the tendency to sway varies directly as the vertical distance between the centre of gravity of the sprung mass and the roll centre, the advantages of the independent suspension system which arise from the widened base will be largely offset but will provide a net resistance to side-sway approximately twice that for a conventional through axle for any given vehicle. By the improved characteristics just mentioned the resistance to side-sway of the present invention does not require stabilizing means as in the prior art. An air spring and a trailing arm are sufficient to provide resistance to side-sway.

Accordingly this invention relates to a vehicle having a load-carrying frame, said frame having a longitudinal centreline, a wheel suspension system comprising, a trailing arm having an upper end and a lower end, a spindle mounted on said arm between the ends thereof, said upper end being pivotally mounted to said frame and said lower end being resiliently affixed to said frame at a point between a wheel track centreline and said longitudinal centreline.

The invention will now be described with particular reference to the drawings in which.

Figure 1:
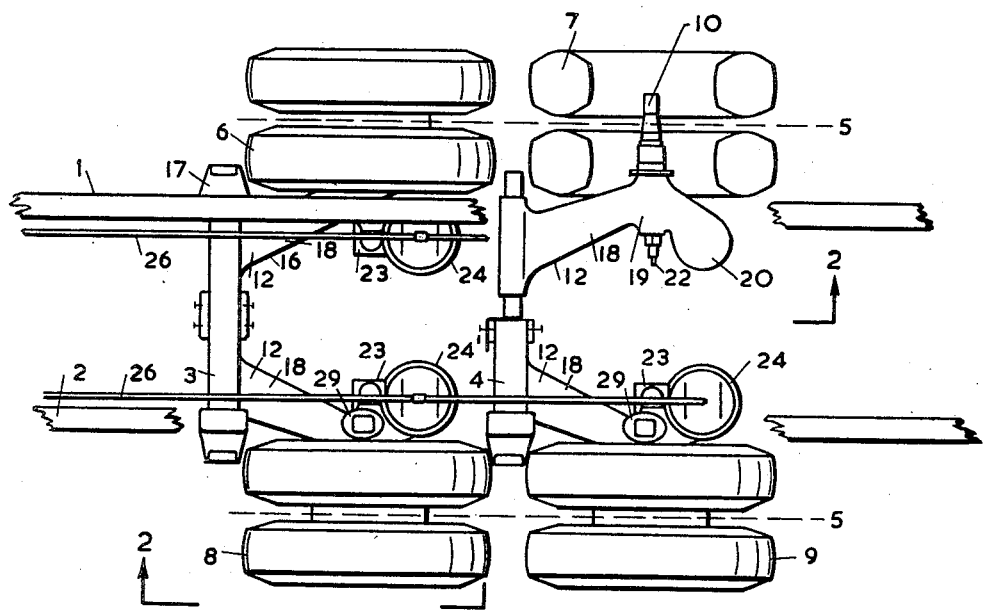
FIGURE 1 is a plan view of a tandem trailer employing a suspension system in accordance with the invention in which the flooring and several elements of one suspension have been removed.
Figure 2:
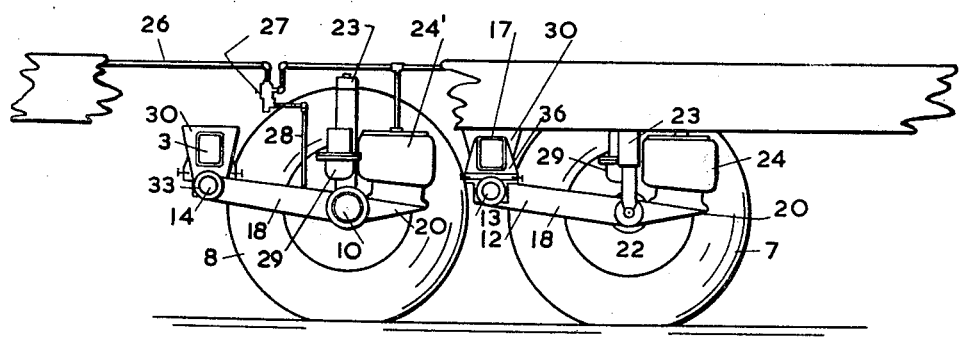
FIGURE 2 is a view taken along line 2—2 of FIGURE 1.
Figure 3:
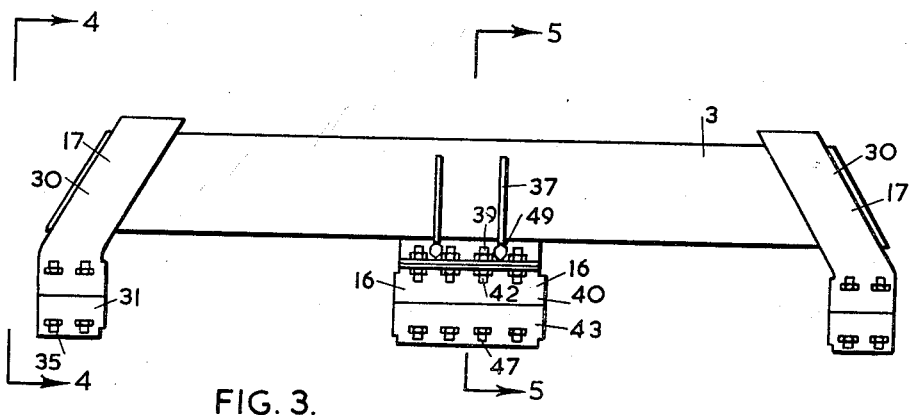
FIGURE 3 is a longitudinal elevation of a transverse frame member having arms supporting brackets thereon in accordance with the invention.
Figure 5:
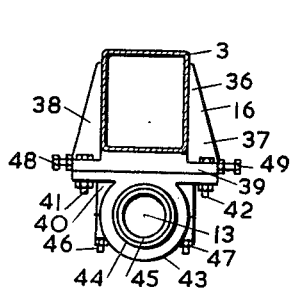
FIGURE 5 is a view taken along line 5—5 of FIGURE 3.
Figure 4:
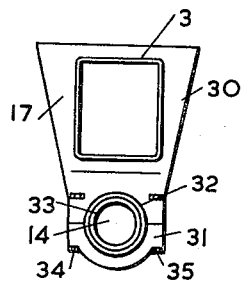
FIGURE 4 is a view taken along line 4—4 of FIGURE 3.
Figure 6:
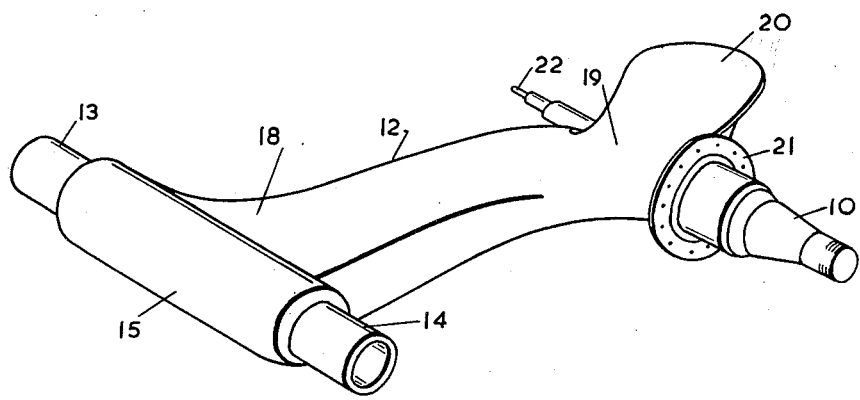
FIGURE 6 is a perspective view of a trailing arm, in accordance with the invention.

In FIGURE 1 the vehicle frame is shown as comprising two longitudinally extending members 1 and 2 which are spaced apart by transverse members such 3 and 4. These members are of closed steel sections and are connected in any conventional manner. The front end of the vehicle may be supported in any suitable fashion and the rear end is supported by the running gear which constitutes the present invention.

Although the running gear is shown as comprising four sets of dual wheels 6, 7, 8 and 9 disposed in two sets in tandem fashion on opposite sides of the vehicle, two sets of single wheels or any desired configuration of wheels may be employed.

Each set of dual wheels is rotatably mounted on a spindle such as shown at 10 and each spindle is in turn mounted on an individual trailing arm such as 12.

Trailing arm 12 is a unitary steel casting which has three main parts. At the front end there is a substantially cylindrical member 15 from the rear surface of which an arm 18 extends to meet a spindle-supporting member 19, and from the rear surface of 19 a flat air-spring platform 20 extends rearwardly and inwardly. Two reamed holes are provided on the inner and outer ends of cylindrical member 15 and into these holes spigots 13 and 14, respectively, are press-fitted and welded. These spigots are pivotally secured to the underframe of the vehicle forward of their respective wheels by inner and outer brackets such as 16 and 17 respectively. The structure of these brackets will be more fully described later.

Wheel-supporting spindle 10 is press-fitted and welded into a suitable reamed hole on the outer surface of the spindle-supporting member 19, and a spigot 22 is suitably mounted on the inner surface. This spigot 22 provides the lower mounting for a shock absorber 23. Spindle supporting member 19 is also provided with a circumferential flange 21 which is adapted to receive an integral brake.

Spigots 13 and 14 have a common centerline which extends at right angles to the longitudinal centerline of the vehicle and is parallel to the main centerline of spindle 10. This arrangement assures that the wheels remain in the same planes with respect to the trailer and this constant alignment, regardless of articulation, permits maximum tire life and reduces the transverse shock characteristic of through-axle type suspensions.

However, arm 18 which extends from the rear surface of member 15 is inclined to the longitudinal centerline of the vehicle as is the main centerline of the air-spring support platform 20.

As shown in FIG. 1 each suspension is provided with its own individual air spring. The spring of the left rear suspension is indicated at 24 and that of the left front suspension is shown as 24'. The lower surface of the springs are secured to the upper surface of the respective spring platforms and the upper surfaces of the springs are secured to the vehicle underframe. Springs 24 and 24' are interconnected by a common air line 26 which is fed by a left side reservoir. One reservoir feeds both the left and right air systems. In each common air line a levelling valve such as 27 is provided. This valve permits adjustment of the air pressure to maintain a constant chassis height regardless of load. Valve 27 is suitably mounted on the vehicle underframe and is connected by a link 28 to trailing arm 12. When the vehicle frame is at the correct height the valve is closed and no air flows. If the frame drops, due to increased load, the valve will sense the drop and admit air until the frame rises to the prescribed height when the valve closes. If the frame rises, due to decreased load, the valve will sense the rise and exhaust air until the frame drops to the prescribed height when the valve closes.

By employing this arrangement, the possibility of axle hop and uneven weight distribution during braking are considerably reduced. With most suspensions, braking causes the wheels bearing a lower load to lock or skid and on empty trailers violent vibrations may be transmitted to the body thereby giving rise to structural failures. With the present system when the brakes are applied the brake torque is transmitted to the arms 12 and they will tend to turn with the wheels. This results in the arms pulling down the trailer and the trailer squatting. However, the weight will tend to be transferred to the front of the trailer and the suspension will be unloaded and the squatting motion will be minimized.

Above each trailing arm on the underside of the longitudinal members 1 and 2 a rubber striker such as 29 is mounted. These strikers limit the vertical travel of the trailing arm over severe bumps and support the load when the air has been completely exhausted from the springs.

As mentioned previously, the trailing arms 12 are each secured forward of their respective wheels by spigots 13 and 14 which are pivotally mounted in brackets 16 and 17 respectively. However, it should be noted that the common centre of the spigots when secured in their respective brackets is above the centreline of wheel spindle 10 so that arm 18 is trailing. Arm 12 inclines downwardly from the brackets to the wheel spindle. Therefore, when a wheel suspended in accordance with the present invention is subjected to a rearward longitudinal shock the wheels recede substantially in the direction of the resultant of the horizontal and vertical components of the shock. The air spring will be compressed and the force absorbed. Since the static friction of the present system is negligible, the trailing arms will respond to the smallest bumps. The dynamic friction or damping is provided by shock absorbers such as 23. These shock absorbers also tend to counteract the tendency to side-sway.

The outer bracket such as 17 is a unitary casting 30 which is provided with a hole through which transverse member 3 extends and is rigidly secured.

The underside of casting 30 is provided with a downwardly facing semi-circular channel which cooperates with cap 31 to define a circular channel adapted to receive spigot 14 and its associated bushings. There are three bushings; an outer steel bushing which is not visible in the drawings, a medial rubber bushing 32, and an inner steel bushing 33. Cap 31 is rigidly secured to casting 30 by bolts such as 34 and 35. Inner bushing 33 is press-fitted on spigot 14 and there is accordingly no relative rotation therebetween. Similarly, the outer bushing is rigidly held by cap 31 so that again there is no relative rotation.

Inner bracket 16 comprises a casting 36 which has at least two upwardly extending flanges 37 and 38 which are adapted to embrace and are secured to the vertical sides of transverse member 3. To base 39 of casting 36 a depending housing 40 is secured by bolts such as 41 and 42. This housing also defines a downwardly facing semi-circular channel which cooperates with a similar channel in a cap 43 to provide a circular hole adapted to receive spigot 13 and its associated bushings. As in bracket 17, the bushings provided in the inner bracket 16 are an outer bushing, a medial rubber bushing 44 and an inner steel bushing 45. Inner bushing 45 is again press-fitted on spigot 13 to prevent relative rotation therebetween and the outer bushing is rigidly secured when cap 43 is mounted. Cap 43 is secured to the undersurface of housing 40 by bolts such as 46 and 47. The relationship between housing 40 and casting 36 is adjustable and for this purpose screws such as 48 and 49 are provided on the forward and aft sides. By adjusting these screws the housing 40 may be moved fore and aft to provide the adjustment for wheel alignment. For stability the inner brackets 16 are mounted adjacent the longitudinal centreline of the vehicle frame and the outer brackets 17 are mounted at the external extremities of the transverse member 3. However, both brackets are disposed between the longitudinal centreline of the vehicle and their respective wheel track centrelines. It is not necessary that the brackets be mounted above the wheel track centreline. By mounting them inboard of the wheel track centreline, the brackets are clear of most objects thrown up by the wheels without detracting from the stability of the system. It should also be noted that this arrangement effects a considerable reduction in the weight of the trailing arm 12.

The air-springs 24 of each system are also secured to the vehicle underframe inboard of the wheel track centre. As previously pointed out in independent suspension systems, the resistance to side-sway varies directly in accordance with the square of the distance between the wheel track centrelines. The air-springs will therefore act as if they are disposed vertically above the wheel track centreline but present the added advantage of being out of line of the objects thrown up by the wheels.

This arrangement also gives use to a further reduction in the weight of the trailing arm over such systems which require the trailing arms to curve round the rear of their respective wheels.

I claim:

1. In a vehicle having a load-carrying frame, a wheel suspension system comprising: transverse trailing arms mounted at their forward end for independent and pivotal movement relative to said frame, and inclined downwardly from said forward ends, an outwardly extending transverse wheel-carrying spindle joined to each of said trailing arms intermediate its forward and rearward ends for receiving wheels which define a wheel track centerline on each side of said frame, each of said trailing arms being of generally V-shaped configuration in plan with the spindle substantially at the apex thereof and the forward end of each trailing arm being connected to said frame at least at one point between its respective wheel track centerline and the longitudinal axis of said frame so that said wheels project laterally outwardly of the connections to said frame; the rearward end of each trailing arm including a spring-supporting platform of substantial area; and spring means interposed between said platforms and said frame.

2. Assembly defined in claim 1 wherein each of said trailing arms is of one-piece unitary construction.

3. Assembly defined in claim 1 wherein said spring means is an air spring.

References Cited in the file of this patent

UNITED STATES PATENTS

| | | |
|---|---|---|
| 2,085,738 | Coleman | July 6, 1937 |
| 2,916,296 | Muller | Dec. 8, 1959 |
| 2,920,903 | Locker | Jan. 12, 1960 |

FOREIGN PATENTS

| | | |
|---|---|---|
| 96,115 | Switzerland | Sept. 16, 1922 |
| 522,103 | Great Britain | June 10, 1940 |
| 604,947 | France | Feb. 8, 1926 |